Figure 1:
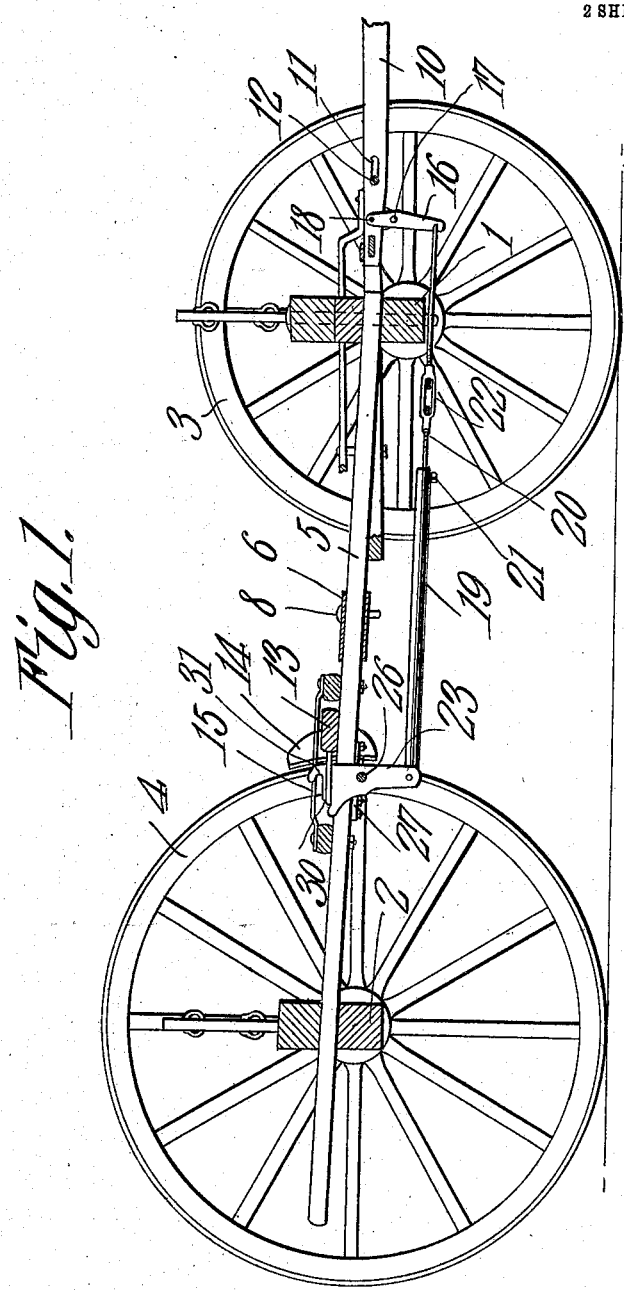

No. 885,749. PATENTED APR. 28, 1908.
J. F. HAGLER.
WAGON BRAKE.
APPLICATION FILED JULY 27, 1907.

2 SHEETS—SHEET 1.

Witnesses

Inventor
John F. Hagler,
By C. A. Snow & Co.
Attorneys

No. 885,749.
PATENTED APR. 28, 1908.
J. F. HAGLER.
WAGON BRAKE.
APPLICATION FILED JULY 27, 1907.
2 SHEETS—SHEET 2.
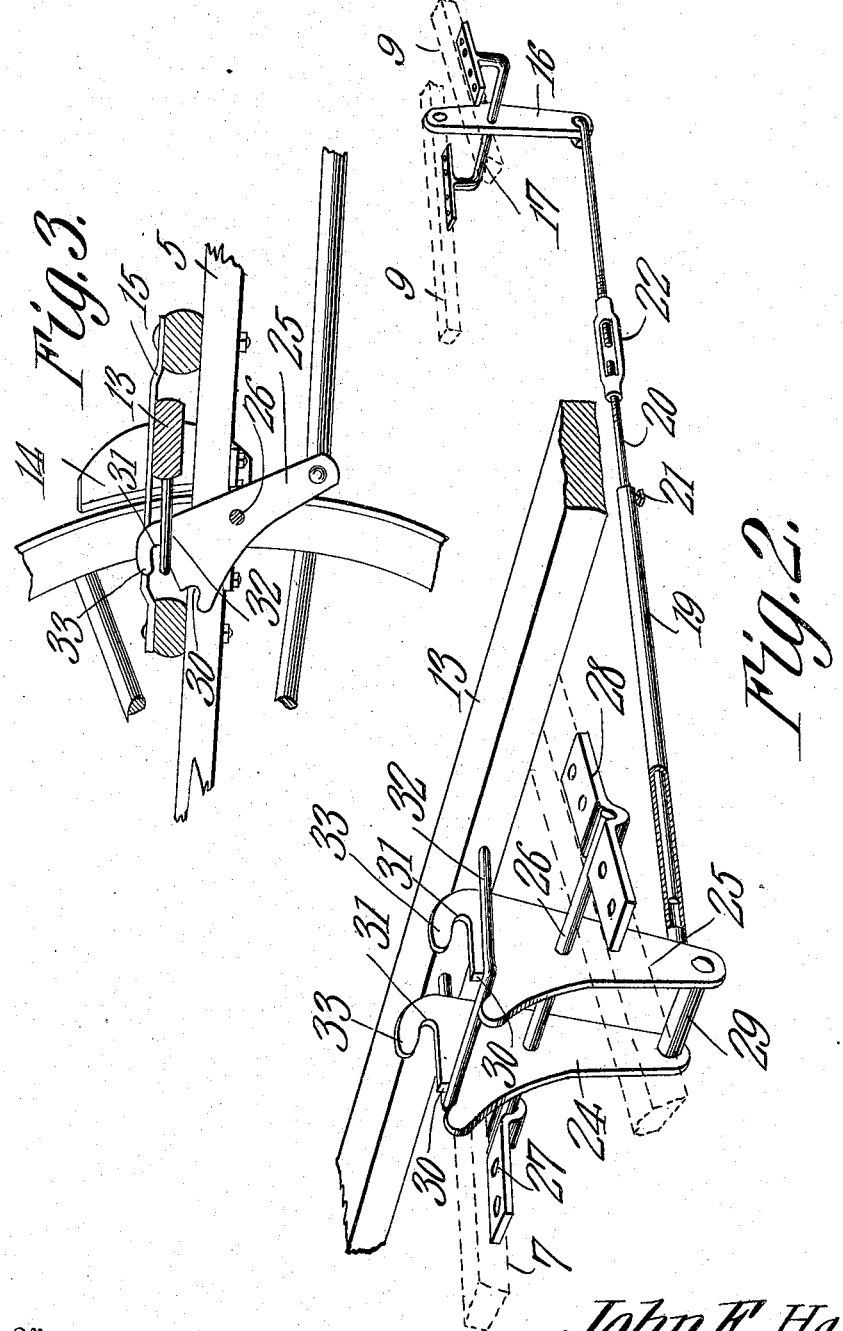

UNITED STATES PATENT OFFICE.

JOHN F. HAGLER, OF SHENANDOAH, IOWA.

WAGON-BRAKE.

No. 885,749.     Specification of Letters Patent.     Patented April 28, 1908.

Application filed July 27, 1907. Serial No. 385,824.

*To all whom it may concern:*

Be it known that I, JOHN F. HAGLER, a citizen of the United States, residing at Shenandoah, in the county of Page and State of Iowa, have invented a new and useful Wagon-Brake, of which the following is a specification.

My present invention relates to improvements in vehicle brakes, and more especially to the class adapted for use on horse drawn vehicles, and the like, and it has for its object to provide an improved brake that is set automatically to retard or stop the movement of the vehicle when a resisting force acts on the draft rigging, such as would occur when the vehicle is descending a hill; the brake being immediately released the moment the retarding force ceases, and a force is applied to the draft rigging that will tend to draw the vehicle in a forward direction, the brake mechanism being so constructed and arranged that the brake will be automatically released entirely when the vehicle is moved backwardly.

Another object of the invention is to provide brake mechanism of this character that is capable of performing the functions above described and which shall be simple and strong in construction so that it may be manufactured cheaply and, in practice, it is reliable, so that accidents are practically impossible.

To these and other ends, the invention comprises the various novel features of construction and combination of parts, which will be hereinafter more fully described, and pointed out particularly in the appended claims.

In the accompanying drawings:—Figure 1 is a side elevation of a vehicle provided with a brake mechanism constructed in accordance with the present invention, parts being shown in section. Fig. 2 is a perspective view of the brake mechanism removed from the vehicle. Fig. 3 is a detail view showing the relative positions of the parts while the vehicle is moving in a backward direction.

Corresponding parts in the several figures are indicated throughout by similar characters of reference.

Brake mechanism constructed in accordance with the present invention is capable of being applied, generally, to vehicles of various kinds, it being shown applied, in the present instance, to a wagon of ordinary construction having front and rear axles 1 and 2 carrying pairs of wheels 3 and 4, the axles being connected by a reach 5 which is usually fitted to slide through a sleeve 6 attached to the rear hounds 7, the reach being usually provided with a set of suitably spaced apertures to receive a fastening pin or bolt 8, such a construction permitting the axles to be adjusted relatively to vary the distance between them. The front axle carries the forward hounds 9, and between the latter is mounted a tongue 10, the latter being so mounted that it is capable of a limited longitudinal movement relatively to the vehicle, the tongue, in the present instance, being provided with a longitudinally extending slot 11 within which a transverse pin or bolt 12 carried by the forward hounds operates.

The brake beam 13 has shoes 14 which coöperate in the usual way with the rear wheel, the beam resting upon the rear hound and is permitted to move into and out of engagement with the wheels by means of the guides 15, the latter being spaced above the hounds a distance sufficient to permit the beam to rise above them a limited distance for a purpose that will be hereinafter more fully described.

The brake mechanism shown in the present embodiment of the invention comprises generally a tongue actuated lever 16 which is fulcrumed on a relatively fixed portion of the vehicle, such, for instance, as a bracket 17 having its ends secured to the undersides of the forward hounds, the upper end of the lever being pivotally connected at 18 to the rear end of the tongue, so that the relative longitudinal movement of the latter will impart a rocking movement to the lever, the lower end of the latter being pivotally attached to a tension rod which serves to communicate the movements of the tongue to the brake beam. This rod may be constructed in any suitable way, that shown in the present instance being composed of a pair of telescopic sections 19 and 20, the member 20 being fitted to slide within the tubular section 19 in order to permit the brake mechanism to be applied to vehicles wherein the distance between the tongue and the brake beam varies, and to permit the brake mechanism to accommodate itself to the different adjustments of the vehicle which vary the distance between the front and rear axles. The sections of the rod are locked in fixed relation by means of a set screw or other suitable device 21, and, if so desired, a turn buckle 22 may be provided on one of the sections for the purpose of closely adjusting the length of the tension rod to obtain the desired braking action on the wheels and to compensate for wear of the brake shoes.

The rear end of the tension rod is pivotally attached to a brake operating lever 23, the latter, in the present instance, being composed of a pair of coöperating members 24 and 25 which are arranged on opposite sides of the wagon reach and are mounted upon a common pivot 26, the latter being firmly supported on a relatively fixed portion of the vehicle, a pair of brackets 27 and 28 being shown in the present instance which coöperate with the opposite ends of the pivot and serve to secure it to the underside of the rear hounds. The lower ends of the members are connected by a cross rod 29 to which the tension rod is attached, and the upper ends of the members are provided with pairs of stepped shoulders 30 and 31, respectively, the shoulders 30 being spaced at a greater distance from the brake beam than the shoulders 31, and they normally coöperate with a loop 32 attached to the brake beam when the latter rests upon the upper sides of the hounds, the shoulders 31 being at a level above the shoulders 30 and are adapted to receive the loop 32 when the brake beam is lifted, as shown in Fig. 3 of the drawing, the shoulder 31 being sufficiently close to the beam as to permit the tongue to operate to the limit of its movement without setting the brakes.

Ordinarily, the operating loop 32 of the brake beam will rest against the shoulders 30 on the brake operating lever, and when the tongue is moved rearwardly relatively to the vehicle, the lever 16 attached thereto will draw the tension rod forwardly, causing the brake operating lever to tilt in a direction that will cause the shoulders on the upper end thereof to move rearwardly, such a movement being transmitted through the loop 32 to the brake beam, thereby causing the brake shoes to be set against the vehicle wheels. Such an operation of the brake mechanism serves to automatically set the brakes on the vehicle when the latter is descending a grade and the horses are retarding the movement of the vehicle in a measure through the medium of the tongue, and the same action will occur when the horses are stopped, the backward strain on the tongue serving to set the brakes and thereby facilitating the stopping of the vehicle. As soon as a force is applied to the tongue to move the vehicle forwardly, the draft mechanism will be operated in a reverse manner to that just described, the brake operating lever being tilted in a direction that will carry the shoulders thereon in a direction toward the brake beam and thus permit the latter to retract and release the brake shoes.

In backing the vehicle, the tongue, of course, will move rearwardly relatively to the vehicle, causing the brake shoes to engage the vehicle wheel. However, when the vehicle is moving in such a direction, the wheels will have a tendency to lift the brake shoes and thus carry the beam upwardly a distance sufficient to disengage the operating loop thereon from the shoulders 30, the loop then engaging beneath the fingers 33 formed above the shoulders 31, the latter being sufficiently close to the brake beam so that the latter will not be operated to set the brake shoes. When the tongue is drawn forwardly, the brake operating lever will be tilted sufficiently to enable the operating loop on the brake beam to reëngage the shoulders 30.

What is claimed is:—

1. In a brake mechanism of the character described, the combination with a brake beam having shoes adapted to coöperate with the vehicle wheels, of a brake operating device having stepped portions thereon arranged at different distances from the beam, a part of the latter arranged to coöperate with the stepped portions, and means actuated by the draft rigging of the vehicle and connected to the brake operating device for setting the brake.

2. In a brake mechanism of the character described, the combination with a vehicle, and a part having a limited longitudinal movement relatively thereto, of a brake beam mounted in coöperative relation to the vehicle wheels and capable of a relative vertical movement, a brake operating lever pivotally mounted on a relatively fixed portion of the vehicle and having stepped shoulders formed thereon at different distances from the brake beam and arranged in different vertical planes, a part on the brake beam arranged to disengage from the lower shoulder when the brake beam is lifted, and means connecting the longitudinally movable part of the vehicle and the brake operating lever.

3. The combination with a vehicle having a tongue movable longitudinally thereof, and a brake beam mounted to coöperate with the vehicle wheels and capable of a relative vertical movement, of a brake operating lever mounted on a relatively fixed part of the vehicle and having stepped portions thereon arranged at different distances from the brake beam and in different horizontal planes, a part on the beam adapted to normally coöperate with the lower portion on the said lever and to disengage therefrom when the brake beam is lifted, and means connecting the tongue and the said lever for operating the brake.

4. The combination with a vehicle having a tongue movable longitudinally thereof, and a brake beam mounted to coöperate with the vehicle wheels, of a brake operating lever composed of a pair of parallel members mounted on a common pivot and having pairs of stepped shoulders on their upper ends, the shoulders being arranged at different distances from the brake beam and in different horizontal planes, the upper shoulders being closer to the beam and provided with overhanging fingers, a loop connected to the beam and arranged to coöperate with the shoulders of the said lever, a tongue actuated lever pivoted on a relatively fixed part of the vehicle and operatively connected to the tongue, and a tension rod connecting the said levers.

In testimony that I claim the foregoing as my own, I have hereto affixed my signature in the presence of two witnesses.

JOHN F. HAGLER.

Witnesses:
 L. M. TUTT,
 I. A. WHEELER.